May 26, 1970  RYOICHI YAMAUCHI  3,514,235
INTAKE MEANS FOR A ROTARY PISTON TYPE ENGINE
Filed Oct. 24, 1968  3 Sheets-Sheet 1

INVENTOR
Ryoichi YAMAUCHI

BY

ATTORNEYS

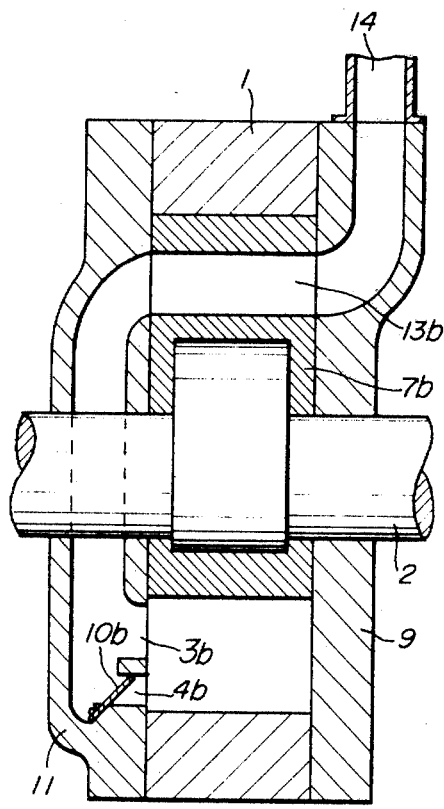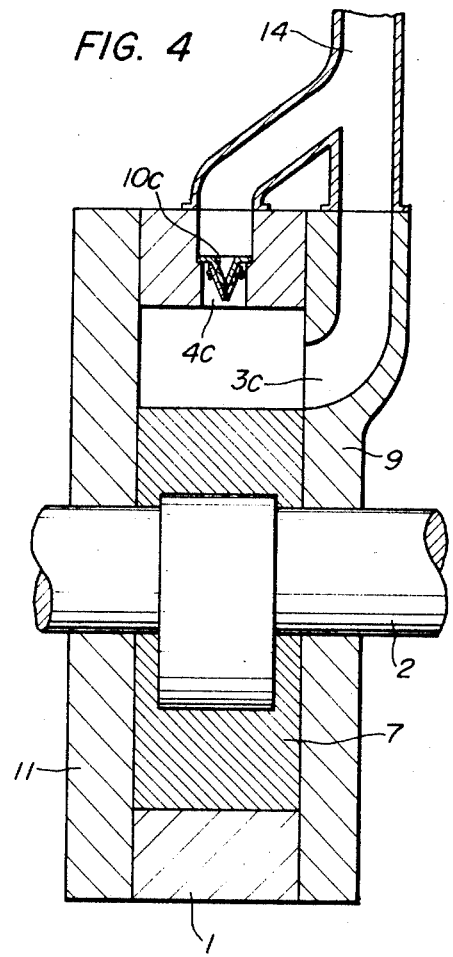

United States Patent Office 3,514,235
Patented May 26, 1970

---

3,514,235
INTAKE MEANS FOR A ROTARY PISTON TYPE ENGINE
Ryoichi Yamauchi, Nagahama-shi, Japan, assignor to Yanmar Diesel Engine Co., Ltd., Osaka, Japan, a corporation of Japan
Filed Oct. 24, 1968, Ser. No. 770,194
Claims priority, application Japan, Nov. 6, 1967, 42/93,602
Int. Cl. F02b 55/16
U.S. Cl. 418—61     1 Claim

ABSTRACT OF THE DISCLOSURE

Intake means for a rotary piston type engine having a main intake port and an auxiliary intake port adapted to be put into an overlapped relation with an exhaust port, a check valve being disposed only in said auxiliary intake port so as to prevent the exhaust gas from flowing back through the auxiliary intake port.

---

The present invention relates to an intake means for a rotary piston type engine comprising a center housing having an epitrochoid curved inner periphery, side housings secured to the opposite sides of said center housing, and a rotor which is of substantially triangular shape and supported by an eccentric portion of an engine shaft, said shaft passing through the center of said center housing and said side housings, said rotor being adapted to rotate in the same direction as and with a speed ratio of 1:3 with respect to the engine shaft so that the apexes of the rotor are slidingly moved along the inner surface of said center housing.

Hithertofore, as an intake means for a rotary piston type engine of this kind, such a type that has at least one intake port in the center housing (hereinafter referred to as "peripheral intake port" type), a type that has at least one intake port in the side housing (hereinafter referred to as "side intake port" type) and a type that has a combination of the peripheral intake port and the side intake port (hereinafter referred to as "combination port" type) have been known.

The peripheral intake port type is advantageous in that the port opening period and the port area can be selected to be relatively large so that a high output power can be obtained at a high speed, however, in this type, since it is impossible to reduce the overlap between the intake and the exhaust ports due to structural limitation, when the pressure within the intake pipe is decreased at an idling or low speed and light load operation with the throttle valve substantially fully closed, a considerable amount of exhaust gas enters into the intake port with the result that the air-fuel mixture is diluted to such a degree that misfiring will occur. Therefore, it is difficult in this type of engine to obtain a smooth operation of the engine at an idling or low speed and light load operation. In contrast to this, in the side intake port type, since the overlap between the intake and the exhaust ports can be reduced or completely eliminated, the possibility of the air-fuel mixture being diluted by the exhaust gas can be substantially decreased so that a smooth idling or low speed and light load operation of the engine can be accomplished. However, in this type, since the port opening period and the port area cannot be sufficiently increased, the amount of intake mixture will become relatively small at a high speed and heavy load operation, so that a high output performance cannot be expected.

If the port opening period and the port area is increased in an engine of side intake port type in order to attain a high output at a high speed operation, the overlap between the intake and the exhaust ports must necessarily be increased and the advantages inherent to the side intake port type are lost.

In the combination port type, since it is intended to enjoy the merits of both the peripheral intake port type which is suitable for a high speed operation and the side intake port type which is suitable for a low speed operation, an arrangement must necessarily be provided for using only the peripheral intake port at a high speed operation and only the side intake port at a low speed operation. For this purpose, a selector valve is required to put the ports selectively into operation, with the result that the structure and the operation of the engine are made complicated.

Therefore, a proposal has been made to provide, in an engine of peripheral intake port type, side intake port type with overlap between intake and exhaust ports, or combination port type without selector valve, a check valve of simple construction within the intake pipe of the engine, the check valve being automatically operated to prevent the exhaust gas from entering the intake pipe so as to prevent the air-fuel mixture from being diluted by the exhaust gas. However, in this arrangement, during a high speed and heavy load operation in which the mixture flow speed is high, the intake resistance at the check valve inevitably increases, so that the amount of fresh intake mixture is correspondingly decreased as compared with an engine of a type that has no check valve and an excellent high speed performance cannot be expected.

The present invention overcomes the above described disadvantages of the intake means in conventional rotary piston type engines and differs from the prior type in which a check valve is provided at the whole area of the intake port in that the present invention has a check valve in only such a portion of the intake port that will overlap with the exhaust port for operation only when the intake and exhaust ports are put into overlapping relation.

The present invention will now be described with respect to preferred embodiments referring to the accompanying drawings. Throughout the several views in the drawings, the same reference numerals designates corresponding parts. In the drawings:

FIGS. 2, 3, 4 and 5 show a rotary piston type engine embodying the present invention.

Figure 1:
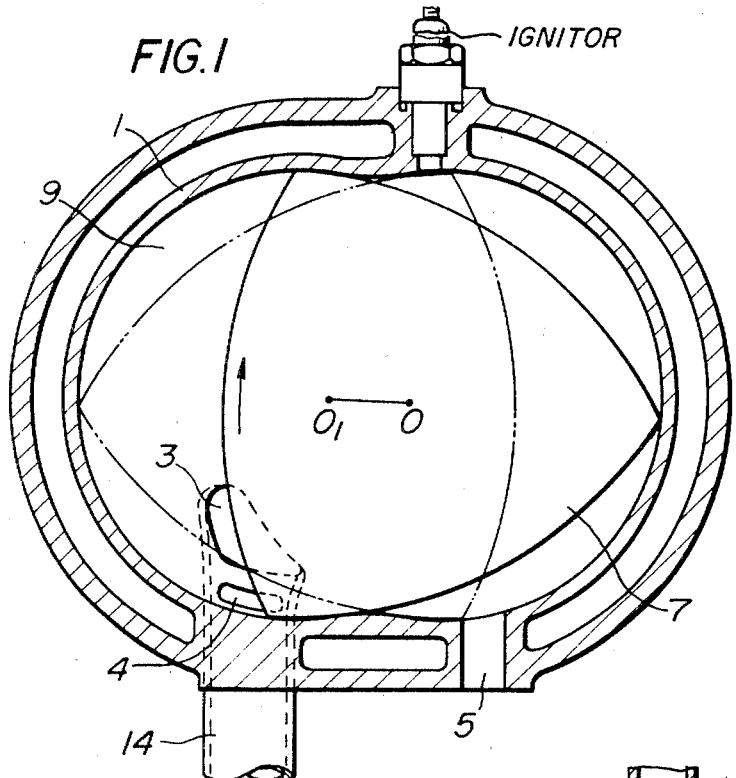
FIG. 1 is a diagrammatic view showing the principle of a rotary piston type engine.

FIG. 1 shows the principle of the side intake port type rotary piston engine, and in this figure, the reference numeral 1 designates a center housing having an epitrochoid inner periphery. The center housing 1 is provided with an exhaust port 5 and has a rotor 7 housed therein for planetary motion in response to the rotation of an engine shaft. A side housing 9 covering one of the sides of said center housing is provided with a main intake port 3 and an auxiliary intake port 4, through which ports air-fuel mixture is introduced into the engine in response to the planetary motion of the rotor 7. Then, compression, combustion and expansion cycles are serially performed and the resultant combustion gas is exhausted through the exhaust port 5 to complete a four cycle operation of the engine.

Further, in this figure, the full line and the chain line show the positions of the rotor 7 in which an overlap between the exhaust port 5 and the auxiliary port 4 begins and ends respectively. The numeral 14 designates an air intake passage.

Figure 2:
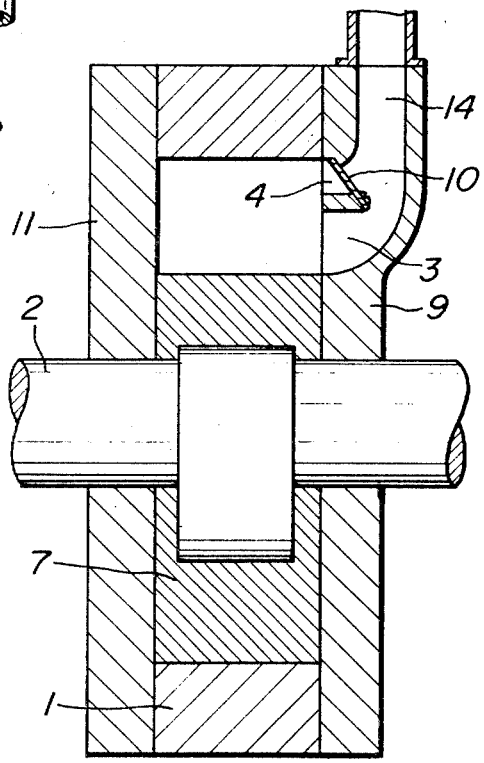

According to the present invention, as shown in FIG. 2, in an engine of the side intake port type having an auxiliary intake port 4, a check valve 10 such as a reed valve is provided at the entrance of said auxiliary intake port 4. The check valve 10 is disposed so that it opens only in the direction of the intake air-fuel mixture.

Therefore, during operation of the engine, the check valve 10 is automatically opened due to the pressure difference across the valve in the direction of the intake air-fuel mixture and prevents the exhaust gas from flowing back into the intake passage 14.

Further, the reference numeral 2 designates an engine shaft, and 11 the other side housing opposite to the side housing 9.

FIG. 3 shows another type of rotary piston engine embodying the present invention, in which the rotor 7b has a passage 13b for passing the fresh intake mixture in order to cool the rotor. In this type, a check valve 10b is provided only in the auxiliary port 4b.

Figure 5:
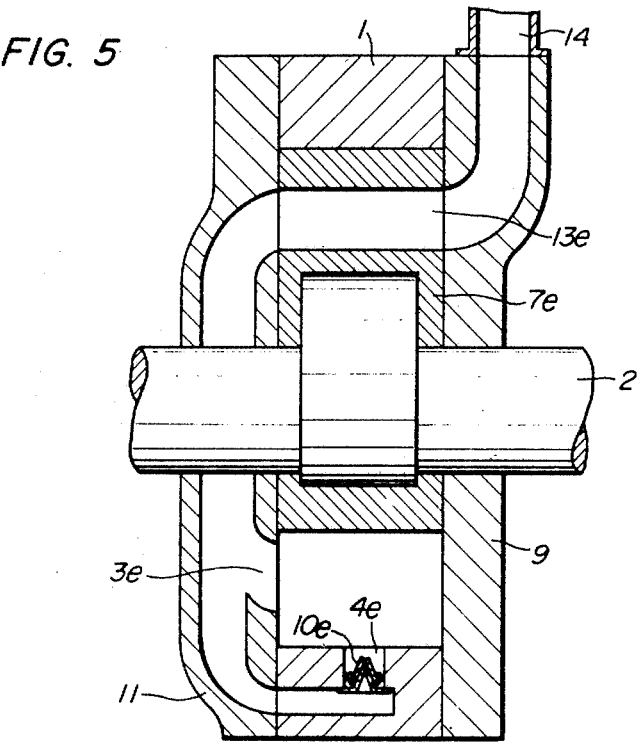

FIGS. 4 and 5 show further embodiments in each of which a main intake port or a side intake port 3c or 3e is provided at such a position in which the overlap between the intake port and the exhaust port is eliminated or decreased so as to increase the port opening period and the area of the intake ports. Further, in this arrangement, in order to increase the amount of the charge of mixture, an auxiliary port 4c or 4e is provided in the center housing, the auxiliary port having a check valve 10c or 10e respectively.

Further, in FIG. 5, the numeral 13e designates a passage of intake mixture provided for the purpose of cooling the rotor 7e.

As apparent from the above descriptions, according to the present invention, the intake means is provided with a set of intake ports including a main intake port 3 and an auxiliary intake port 4, and a check valve 10 disposed adjacent to the entrance opening of said auxiliary intake port 4, whereby during a low speed and light load operation and an idling operation in which the engine throttle valve is substantially fully closed, the exhaust gas is prevented from entering the auxiliary intake port 4 and diluting the air-fuel mixture, the intake efficiency is increased and the low speed performance is substantially increased. Further, according to the present invention, since the check valve is provided only in the auxiliary intake port 4, as compared with a conventional engine in which a check valve is provided in the whole area of the main and the auxiliary intake ports, the intake resistance can be substantially decreased during a high speed and heavy load operation with the throttle valve fully opened and a substantial amount of intake air-fuel mixture flowing into the engine. Thus, the present invention is effective to obtain full high speed performance inherent to a rotary piston type engine. Further, according to the present invention, since the check valve is provided only at a part of the set of intake ports, the engine is easy to design and practically useful.

The advantageous features of the present invention can be well recognized from the following example.

While in a typical engine of a conventional type having an auxiliary intake port without check valve the lowest critical misfiring speed at an idling operation was 1800 r.p.m., an engine having a check valve arranged in accordance with the present invention could operate smoothly without any misfiring at an idling speed lower than 700 r.p.m. The result is shown in FIG. 6.

Figure 6:
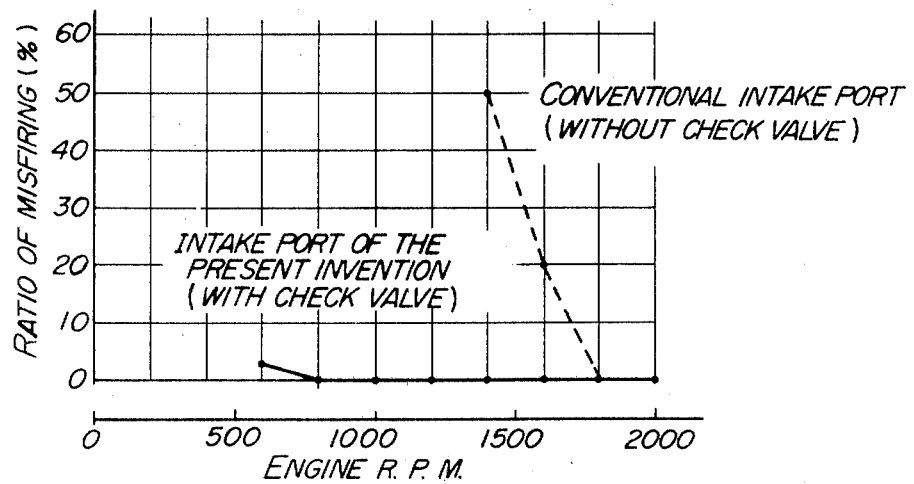
FIG. 6 is a diagram showing experimental data of the ratio of misfiring.

FIG. 6 shows data of the ratio of misfiring (the ratio of the misfired cycles and the total cycles) with respect to an engine of a conventional intake port type and that of the present invention.

I claim:

1. In a rotary piston type engine comprising a center housing having an epitrochoid curved inner periphery, side housings secured to the opposite sides of said center housing, and a rotor which is of substantially triangular shape and supported by an eccentric portion of an engine shaft, said shaft passing through the center of said center housing and said side housings, said rotor being adapted to rotate in the same direction as and at a speed ratio of 1:3 with respect to the engine shaft, so that the apexes of the rotor are slidingly moved along the inner surface of said center housing; the improvement comprising an intake means for the rotary piston type engine having a set of intake ports including a main intake port and an auxiliary intake port adapted to be put into overlapping relation with an exhaust port, said auxiliary intake port being provided with a check valve adjacent to the entrance opening thereof.

References Cited

UNITED STATES PATENTS 3,075,505   1/1963   Froede et al.

MARK M. NEWMAN, Primary Examiner

A. D. HERRMANN, Assistant Examiner